(12) United States Patent
Bennah et al.

(10) Patent No.: US 8,213,297 B2
(45) Date of Patent: Jul. 3, 2012

(54) DUPLICATE INTERNET PROTOCOL ADDRESS RESOLUTION IN A FRAGMENTED SWITCH STACK ENVIRONMENT

(75) Inventors: Albert D. Bennah, Durham, NC (US); William M. Edmonds, Durham, NC (US); Tushar D. Fadale, Raleigh, NC (US); Akihiko Kuroda, Cary, NC (US); Bahram S. Sanaei, Raleigh, NC (US); Nicholas M. Williamson, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 869 days.

(21) Appl. No.: 11/945,694

(22) Filed: Nov. 27, 2007

(65) Prior Publication Data
US 2009/0135715 A1    May 28, 2009

(51) Int. Cl.
*G06F 11/00*    (2006.01)
(52) U.S. Cl. ........ 370/217; 370/219; 370/252; 370/256; 370/401
(58) Field of Classification Search .................. 370/217, 370/218, 219, 252, 254, 401
See application file for complete search history.

(56) References Cited

U.S. PATENT DOCUMENTS

| | | | |
|---|---|---|---|
| 6,917,626 B1 | 7/2005 | Duvvury | |
| 7,336,622 B1 * | 2/2008 | Fallis et al. | 370/252 |
| 7,526,033 B2 * | 4/2009 | Sindalovsky et al. | 375/257 |
| 7,697,419 B1 * | 4/2010 | Donthi | 370/220 |
| 2003/0169748 A1 * | 9/2003 | Weyman et al. | 370/401 |
| 2005/0063354 A1 * | 3/2005 | Garnett et al. | 370/351 |
| 2005/0207414 A1 | 9/2005 | Duvvury | |
| 2005/0271044 A1 * | 12/2005 | Hsu et al. | 370/360 |
| 2006/0092832 A1 * | 5/2006 | Santoso et al. | 370/218 |
| 2006/0146697 A1 | 7/2006 | Magret et al. | |
| 2006/0235997 A1 | 10/2006 | Munirajan et al. | |
| 2007/0097992 A1 | 5/2007 | Singh et al. | |
| 2008/0205418 A1 * | 8/2008 | Rose et al. | 370/401 |
| 2008/0301319 A1 * | 12/2008 | Dernosek et al. | 709/232 |

FOREIGN PATENT DOCUMENTS

KR    2006063133 A    6/2006

* cited by examiner

*Primary Examiner* — Ricky Ngo
*Assistant Examiner* — Rasheed Gidado
(74) *Attorney, Agent, or Firm* — Steven M. Greenberg, Esq.; Carey, Rodriguez, Greenberg & O'Keefe

(57) ABSTRACT

Embodiments of the present invention provide a novel and non-obvious method, system and computer program product for an Internet protocol (IP) address resolution process during an original switch stack fragmentation, by employing a secondary communication link. A method for IP address resolution of a fragmented switch stack over a secondary communication link (e.g., an I2C bus) can include detecting a first switch stack fragment by a first stack master, detecting a second switch stack fragment by a second stack master, disabling all switches of the first switch stack fragment and the second switch stack fragment, connecting the first stack master and the second stack master to a stack management module via a secondary communication link, and electing one stack fragment to use the IP address of the original switch stack based on at least one election criteria. The method can further include instructing the stack master of the elected one stack fragment to power up the switches of the elected one stack fragment.

15 Claims, 2 Drawing Sheets

DUPLICATE INTERNET PROTOCOL ADDRESS RESOLUTION IN A FRAGMENTED SWITCH STACK ENVIRONMENT

BACKGROUND OF THE INVENTION

1. Field of the Invention

The present invention generally relates to the management of a system of stackable switches in a data communication network, and more particularly to Internet Protocol (IP) address resolution during fragmentation of a system of stackable switches.

2. Description of the Related Art

Network switch stacking technology allows the aggregation of several similar network switching devices for the purpose of creating a single larger (higher throughput) logical switch device called a stack. Once in a stack configuration, switch stack addressing logic typically is applied to determine which device will become the "master" of the stack with the other remaining devices becoming "members" of the switch stack. The system of stack switches is generally, for example, identified with one Internet Protocol (IP) address and one stack address. This makes the system of stackable switches appear as one logical unit, particularly, to external devices communicating with the system. By applying switch stack addressing logic, the switch members will "lose" their pre-assigned IP addresses and assume the IP address of the stack master.

The system of stackable switches is generally coupled in series and the topology of the system generally characterized by a closed loop called a ring or an open strand of switches referred to herein as a chain. Each of the stackable switches is adapted to perform switching between its own data ports as well as the data ports of other stackable switches by transmitting packets via the stack ports, that facilitate the efficient transmission and switching of these packets to the appropriate stack switch port.

In conventional network switch stacking systems, a problem arises whenever the switch stack becomes fragmented, e.g., as caused by a pulled connection cable, resulting in two or more fragmented stacks, where each of the two or more fragmented stacks will have the IP address of the original stack master. Such IP address duplication is prohibited and the conventional way to resolve such IP address duplication as a result of a fragmented stack is for a network or system administrator to manually reset the IP addresses.

BRIEF SUMMARY OF THE INVENTION

Embodiments of the present invention address deficiencies of the art in respect to network switch stacking technology and provide a novel and non-obvious method, system and computer program product for an Internet protocol (IP) address resolution process during an original switch stack fragmentation over a secondary communication link. In one embodiment of the invention, a method for IP address resolution of a fragmented switch stack over a secondary communication link (e.g., an I2C bus) is provided. The method can include detecting a first switch stack fragment by a first stack master, detecting a second switch stack fragment by a second stack master, disabling all switches of the first switch stack fragment and the second switch stack fragment, connecting the first stack master and the second stack master to a stack management module via a secondary communication link, and electing one stack fragment to use the IP address of the original switch stack based on at least one election criteria. The method can further include instructing the stack master of the elected one stack fragment to power up the switches of the elected one stack fragment.

In another embodiment of the invention, a switch stack management device configured for Internet protocol (IP) address control of a fragmented switch stack is provided. The device can include a secondary communication link in communication with a service processor and coupled to a plurality of stackable switches. The system also can include IP address processor logic. The logic can include program code enabled to detect a first switch stack fragment by a first stack master via the secondary communication link, to detect a second switch stack fragment by a second stack master via the secondary communication link; to disable all switches of the first switch stack fragment and the second switch stack fragment; and to elect one stack fragment to use the IP address of the original switch stack based on at least one election criteria.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for IP address control of fragmented switch stack in data computing systems. In accordance with an embodiment of the invention, IP address control for a fragmented switch stack is provided. The IP address control can be generated by detection of a first switch stack fragment by a first stack master and detection of a second switch stack fragment by a second stack master. Thereafter, all the switches of the first switch stack fragment and the second switch stack fragment can be disabled and the first stack master and the second stack master can be connected to a stack management module via a secondary communication link. The stack management module can determine which of stack fragments will be permitted the use the IP address of the original switch stack based on at least one election criteria.

Figure 1:
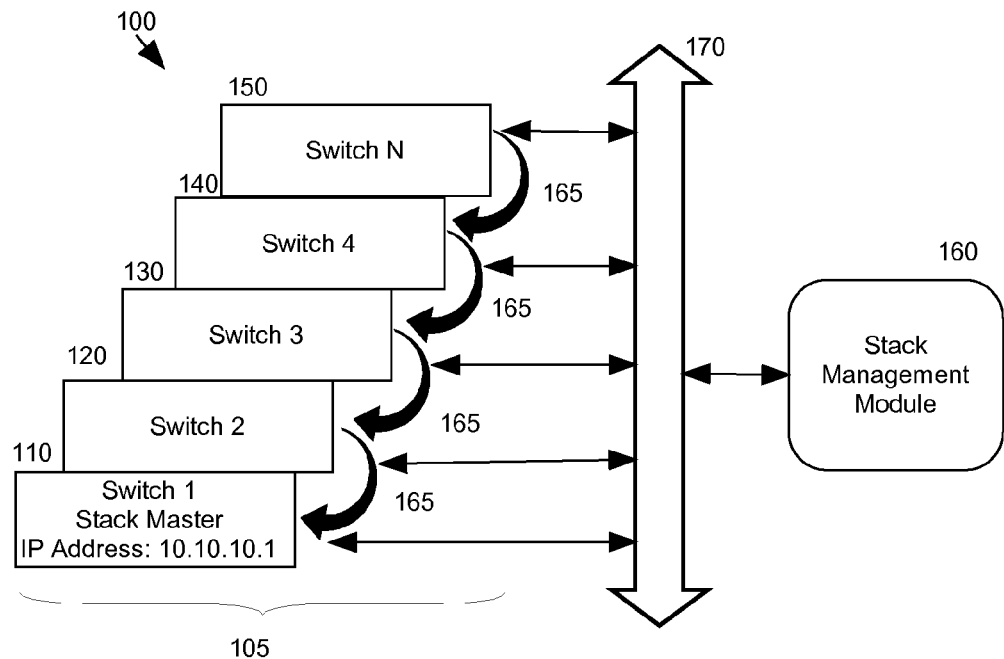
FIG. 1 is a schematic illustration of a data processing system that includes a system of stackable switches (a switch stack), a stack management module and a secondary communication link.

In illustration, FIG. 1 is a schematic illustration of a data processing system that includes a system of stackable switches (a switch stack), a stack management module and a secondary communication link. Data processing system 100 can include one or more chassis 105 e.g., blade server chassis, multiple stackable switches 110, 120, 130, 140, 150, a switch stack management module 160, a primary communication link 165, e.g., a cable using a Transmission Control Protocol/Internet Protocol (TCP/IP), and a secondary communication link 170, e.g., an I2C bus. In one embodiment, data processing system 100 employs I2C bus architecture. The I2C bus 170 is a bidirectional serial bus requiring only two wires: serial data line (SDA) and serial clock line (SCL). Although serial buses do not have the throughput capability of parallel buses, serial buses require less wiring and fewer Integrated Circuit (IC) connector pins. Each device (multiple stackable switches 110, 120, 130, 140, 150, switch stack management module 160 and any other I2C compatible devices) connected to I2C bus 170 is software addressable by a unique address. These devices can operate as either transmitters or receivers.

The Inter-Integrated Circuit (I2C) bus is a bi-directional two-wire serial bus designed to exploit these similarities. Devices on the I2C bus are accessed by individual addresses, 00-FF (typically, even addresses for Writes, odd addresses for Reads). The I2C architecture can be used for a variety of functions. One example is Vital Product Data (VPD). Each component in the system can contain an Electrically Erasable Programmable Read Only Memory (EEPROM) that which contains the VPD information such as serial numbers, part numbers, engineering change revision level, etc.

I2C buses can connect a number of devices simultaneously to the same pair of bus wires. All I2C bus compatible devices have an on-chip interface, which allows the devices to communicate directly with each other via the I2C bus 170. A simple master/slave relationship exists at all times. A master is a device which initiates a data transfer and the clock signals to permit the transfer, and any device addressed at the time of transfer is considered a slave. The I2C bus 170 is a multi-master bus, meaning more than one device capable of controlling the bus can be connected to it. The stackable switches 110, 120, 130, 140, 150 and switch stack management module 160 are communicatively linked to the other over the serial bus 170.

A service processor of stack management module 160 can include an operating system that supports the operation of IP address management logic configured to process fragmented switch stack information to determine which fragmented stack, if any, has permission to use the IP address of the original stack switch. IP address processor logic can include program code enabled to detect a first switch stack fragment by a first stack master via the secondary bus, to detect a second switch stack fragment by a second stack master via the secondary bus, to disable all switches of the first switch stack fragment and the second switch stack fragment and to elect one stack fragment to use the IP address of the original switch stack based on at least one election criteria.

In accordance with an embodiment of the present invention, each stackable switch 10, 120, 130, 140, 150 can include a switch stack management module 160. Switch stack management module 160 is configured for IP address control of the switch stack 105. The switch stack management module 160 can be coupled to stackable switch 105 and in communication with a service processor via the secondary link 170. Alternatively, the switch stack management module 160 can be integrated into a network management service entity but remain in communication with the switch stack 105 via the secondary communication link 170.

Figure 2:
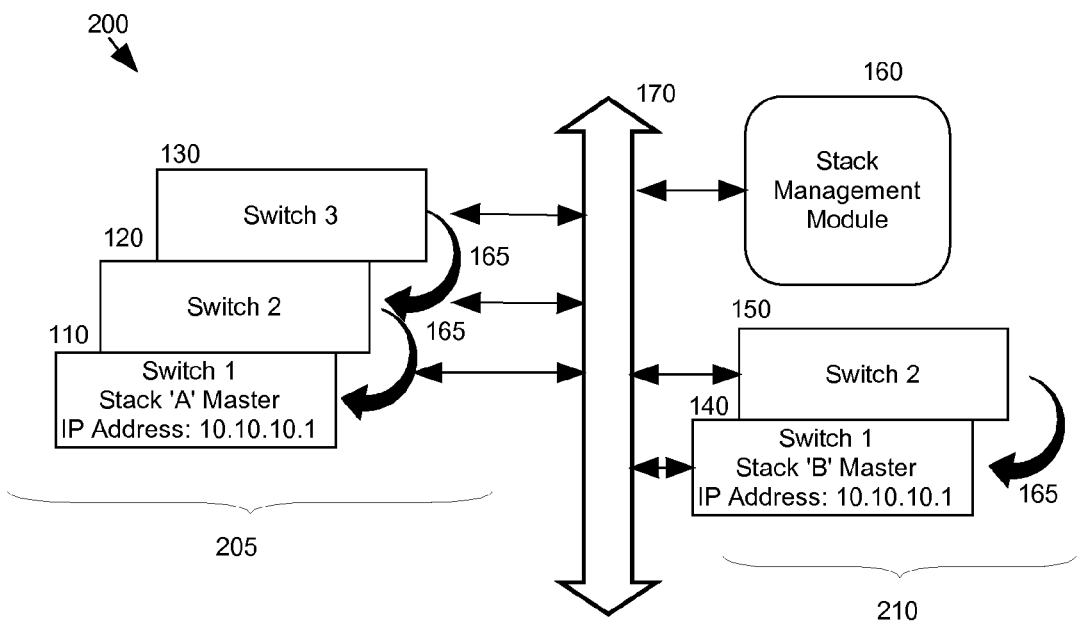
FIG. 2 is a schematic illustration of the fragmentation of the switch stack of FIG. 1; and, FIG. 3 is a flow chart illustrating a process to provide IP address control for the fragmented switch stack of FIG. 2.

In further illustration, FIG. 2 is a schematic illustration of the fragmentation of the switch stack 105 of FIG. 1. As illustrated in FIG. 2, switch stack 105 has fragmented between switch 130 and switch 140, which results in a first switch stack fragment 205 and second switch stack fragment 210. Consequently, the respective stack masters 110, 140 of both stack fragments 205 and 210 will adopt the original IP address of switch stack 105. For example, as illustrated in FIG. 2, Stack A Master 110 will identify itself with IP Address "10.10.10.1". In addition, Stack B Master 140 will identify itself with IP Address "10.10.10.1". As stated earlier, each logical unit must have its own unique IP address. Accordingly, stack management module 160 can intercede to control the assignment of the original IP address of switch stack 105. In one embodiment, the original stack master can become aware that its stack has fragmented and also can become aware of the other new stack masters, e.g., Stack B Master 140, and determine the characteristics of the "other" stacks, such as size of stack, total uptime, and the like.

The fragmenting of the switch stack 105 can be the result of an accidental event, such as the pulling or disconnecting of a connection cable, or it can be the result of an intentional fragmentation, such as in order to service a defective member (switch device). In addition, each stack "master" can have sufficient logic to remove one or more defective switch units from the stack controlled by that stack "master". In these embodiments, fragmenting of the original stack would occur and result in the prohibited IP address duplication, which stack management module 160 can successfully resolve.

Figure 3:
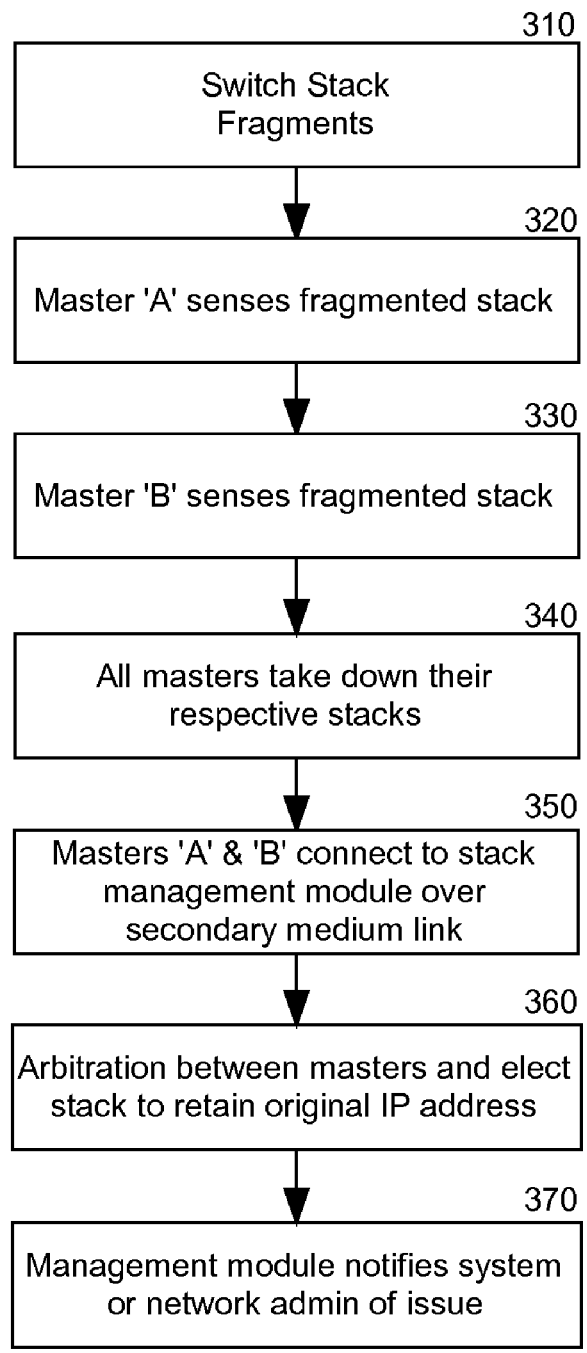

In further illustration, FIG. 3 is a flow chart illustrating a process to provide IP address control for the fragmented switch stack of FIG. 2. Beginning in block 310, switch stack 105 has fragmented, e.g., between switch 130 and switch 140, which results in a first switch stack fragment 205 and second switch stack fragment 210. In block 320, Stack A Master 110 senses a fragmented stack 105, as it has lost one or more of its stack members. In block 330, Stack B Master 140 senses a fragmented stack 105, as it has lost its original master. In block 340, all "masters" take down their respective switch stack fragments 205, 210 and, in block 350, communicate with stack management module 160 via the secondary communication link 170.

In block 360, the stack management module 160 can arbitrate between the switch stack fragments 205, 210 to determine which of the switch stack fragments 205, 210 will be allowed to retain use of the original IP address. In one embodiment, the stack management module 160 can use the characteristics of the various switch stack fragments 205, 210 to reach a decision in its arbitration process. In another embodiment, the original stack master can disable its own stack if it fails to meet the election criteria. In yet another embodiment, the original stack master, e.g., Stack A Master 110, can always take down its own stack if there is no more than one secondary stack created as a result of the stack fragmentation. In still yet another embodiment, all newly created secondary stack masters, sensing loss of connectivity from the original master 110, automatically go down to avoid IP address duplication.

Additionally, in block 360, the stack management module 160 can instruct the master of the "elected" stack to retain use of the original IP address and that the elected stack power up.

In block 370, the stack management module 160 can notify the issue of the switch stack fragmentation to the attention of a network or system administrator. Alternatively, each individual stackable switch 10, 120, 130, 140, 150 can report loss of connectivity with other stack members. The stack management module 160 can also provide with the alerts some extended data conveying attributes, e.g., IP address, size, total uptime, etc., of the reporting stack.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for Internet protocol (IP) address resolution during a switch stack fragmentation, the method comprising:
   detecting an IP address of an original switch stack;
   detecting a first switch stack fragment by a first stack master;
   detecting a second switch stack fragment by a second stack master;
   disabling all switches of the first switch stack fragment and the second switch stack fragment;
   connecting the first stack master and the second stack master to a stack management module via an I2C bus communication link;
   electing one stack fragment to use the IP address of the original switch stack based on at least one election criteria; and
   determining the stack fragment having the greatest number of stack switches.

2. The method of claim 1, further comprising instructing the stack master of the elected one stack fragment to power up the switches of the elected one stack fragment.

3. The method of claim 1, further comprising transmitting a notification message that includes information of the stack fragmentation and the elected one stack fragment to a system administer.

4. The method of claim 1, further comprising determining the stack fragment with the longest uptime.

5. The method of claim 1, further comprising disabling the original stack master conditioned upon having only one second switch stack fragment with a second stack master.

6. The method of claim 1, further comprising disabling at least one second stack master upon sensing loss of connectivity with the original stack master.

7. A switch stack address management system configured for Internet protocol (IP) addressing control during switch stack fragmentation, the system comprising:
   a switch stack management device coupled to a plurality of stack switches and an I2C bus communication link; and,
   IP address processor logic comprising program code enabled to detect an IP address of an original switch stack, to detect a first switch stack fragment by a first stack master via the I2C bus communication link, to detect a second switch stack fragment by a second stack master via the I2C bus communication link, to disable all switches of the first switch stack fragment and the second switch stack fragment, to elect one stack fragment to use the IP address of the original switch stack based on at least one election criteria, and to determine the stack fragment having the greatest number of stack switches.

8. The address management system of claim 7, wherein the first switch stack fragment and the second switch stack fragment reside within a single chassis.

9. The address management system of claim 7, wherein the first switch stack fragment and the second switch stack fragment reside across multiple chassis.

10. A computer program product comprising a computer usable storage memory having stored therein computer usable program code for Internet protocol (IP) address resolution during a switch stack fragmentation, the computer usable program code, which when executed by a computer hardware system, causing the computer hardware system to perform detecting an IP address of an original switch stack;
    detecting a first switch stack fragment by a first stack master;
    detecting a second switch stack fragment by a second stack master;
    disabling all switches of the first switch stack fragment and the second switch stack fragment;
    connecting the first stack master and the second stack master to a management module via an I2C bus communication link;
    electing one stack fragment to use the IP address of the original switch stack based on at least one election criteria; and
    determining the stack fragment having the greatest number of stack switches.

11. The computer program product of claim 10, wherein the computer usable program code further causes the computer hardware system to perform instructing the stack master of the elected one stack fragment to power up the switches of the elected one stack fragment.

12. The computer program product of claim 10, wherein the computer usable program code further causes the computer hardware system to perform transmitting a notification message that includes information of the stack fragmentation and the elected one stack fragment to a system administer.

13. The computer program product of claim 10, wherein the computer usable program code further causes the computer hardware system to perform determining the stack fragment with the longest uptime.

14. The computer program product of claim 10, wherein the computer usable program code further causes the computer hardware system to perform disabling the original stack master conditioned upon having only one second switch stack fragment with a second stack master.

15. The computer program product of claim 10, wherein the computer usable program code further causes the computer hardware system to perform disabling at least one second stack master upon sensing loss of connectivity with the original stack master.

* * * * *